(12) United States Patent
Yao

(10) Patent No.: US 9,853,517 B2
(45) Date of Patent: Dec. 26, 2017

(54) CEILING FAN MOTOR STRUCTURE

(71) Applicant: Chao Chin Yao, Taichung (TW)

(72) Inventor: Chao Chin Yao, Taichung (TW)

(*) Notice: Subject to any disclaimer, the term of this patent is extended or adjusted under 35 U.S.C. 154(b) by 278 days.

(21) Appl. No.: 14/944,328

(22) Filed: Nov. 18, 2015

(65) Prior Publication Data

US 2017/0141639 A1    May 18, 2017

(51) Int. Cl.
*H02K 5/00* (2006.01)
*H02K 5/04* (2006.01)
*H02K 1/06* (2006.01)

(52) U.S. Cl.
CPC .................. *H02K 5/04* (2013.01); *H02K 1/06* (2013.01)

(58) Field of Classification Search
CPC ............... H02K 9/06; H02K 5/04; H02K 5/00
USPC .................................................... 310/89, 91
See application file for complete search history.

(56) References Cited

U.S. PATENT DOCUMENTS

| | | | |
|---|---|---|---|
| 2003/0218396 A1* | 11/2003 | Hsieh ................... | F04D 25/088 310/89 |
| 2008/0012439 A1* | 1/2008 | Wu ........................ | H02K 1/187 310/89 |
| 2008/0169732 A1* | 7/2008 | Chang .................. | F04D 25/088 310/67 R |
| 2011/0101923 A1* | 5/2011 | Tseng ................. | H02K 11/0094 320/137 |
| 2013/0076213 A1* | 3/2013 | McCloud ................. | H02K 5/00 310/75 D |
| 2014/0217845 A1* | 8/2014 | Chang .................... | H02K 5/10 310/89 |

* cited by examiner

*Primary Examiner* — Thanh Lam
(74) *Attorney, Agent, or Firm* — Rosenberg, Klein & Lee

(57) ABSTRACT

A ceiling fan motor structure includes a housing, a magnetic ring, and a cover. The housing has an annular wall and a shielding plate which jointly define a receiving room. The open side of the annular wall forms an opening. The housing has an annular edge around the opening. The annular wall has a plurality of projections projecting from the inner wall surface of the receiving room. The magnetic ring has a plurality of recesses on its outer periphery and is placed into the receiving room of the housing in a way in which the recesses are respectively aligned with the projections and in which each projection is placed in the corresponding recess to prevent relative rotation between the magnetic ring and the housing. The cover closes the opening and is fixedly connected to the housing.

6 Claims, 6 Drawing Sheets

CEILING FAN MOTOR STRUCTURE

BACKGROUND OF THE INVENTION

1. Technical Field

The present invention relates to a ceiling fan motor structure and more particularly to an improved motor structure for driving the blades of a ceiling fan to rotate.

2. Description of Related Art

Referring to FIG. 5 and FIG. 6 for a conventional ceiling fan motor structure, the motor structure essentially includes a housing 91 in which a magnetic ring 92 and an excitation coil 93 are provided, and which is covered with a cover 94. When electricity is supplied to and excites the excitation coil 93, the magnetic ring 92 causes the excitation coil 93 to rotate and thereby drive the blades of a ceiling fan into rotation.

To prevent the magnetic ring 92 from rotating relative to the housing 91, a plurality of grooves 921 are provided in the outer periphery of the magnetic ring 92, and during the process in which the magnetic ring 92 is mounted into the housing 91, a plurality of shafts 95 are inserted through the grooves 921 of the magnetic ring 921 respectively as well as through the housing 91 to secure the magnetic ring 92 and the housing 91.

However, the conventional ceiling fan motor structure has the following problems:

1. During assembly, it is required either to insert the shafts 95 through the housing 91 before the magnetic ring 92 is placed into the housing 91 with the grooves 921 aligned respectively with the shafts 95, or to place the magnetic ring 92 into the housing 91 before the shafts 92 are inserted through the housing 91 and the grooves 921. In either case, the assembly process is inconvenient, and an increase in assembly efficiency is hard to obtain.

2. The magnetic ring 92 must be placed into the housing 91 in the correct direction, and yet the grooves 921, through which the shafts 95 are to pass and which extend through the magnetic ring 92, tend to confuse the assembler who tries to identify the correct assembly direction. In addition, the grooves 921, which extend through the magnetic ring 92 and whose size corresponds to the diameter of the shafts 95, compromise the structural strength of the magnetic ring 92 in areas adjacent to the grooves 921 such that these areas are likely to break due to shaking or collision.

BRIEF SUMMARY OF THE INVENTION

It is an objective of the present invention to provide a ceiling fan motor structure which allows easy and highly efficient assembly and thereby solves the aforementioned problems.

It is another objective of the present invention to provide a magnetic ring with recesses which do not extend through the magnetic ring so that the magnetic ring has higher structural strength in areas adjacent to the recesses than its prior art counterparts, meaning those areas are less likely to break due to shaking or collision.

To achieve the foregoing objectives, the present invention includes a housing, a magnetic ring, and a cover as described below:

The housing has an annular wall and a shielding plate on one side of the annular wall, wherein the annular wall and the shielding plate jointly define a receiving room. The opposite side of the annular wall is open and forms an opening. The housing has an annular edge extending around, and outward from the periphery of, the opening. The annular wall further has a plurality of projections projecting from the inner wall surface of the receiving room.

The magnetic ring has an outer periphery provided with a plurality of recesses corresponding respectively to the projections. The magnetic ring is placed in the receiving room of the housing in a way in which the recesses are respectively aligned with the projections and in which each of the projections is placed in a corresponding one of the recesses to prevent relative rotation between the magnetic ring and the housing.

The cover closes the opening and is fixedly connected to the housing.

Preferably, each of the recesses extends radially inward from the outer periphery of the magnetic ring to a depth which increases in a direction toward the shielding plate and which decreases in a direction away from the shielding plate such that an inclined bottom is formed. When the magnetic ring is placed in the receiving room of the housing, the tip of each of the projections is pressed against the inclined bottom of the corresponding one of the recesses to fix the projection in place.

Preferably, each of the recesses extends radially inward from the outer periphery of the magnetic ring and has an open end facing the shielding plate and a closed end facing away from the shielding plate. Therefore, each of the projections is allowed to enter only the open end of the corresponding one of the recesses of the magnetic ring.

Preferably, the housing forms a step inside the annular wall. The step surrounds the periphery of the shielding plate and has a step surface facing the opening. The magnetic ring is pressed against the step surface when placed in the receiving room.

Preferably, the cover is plate-shaped, has a width matching the annular edge of the housing, and is connected to the annular edge to close the opening.

DETAILED DESCRIPTION OF THE INVENTION

FIG. 1 to FIG. 4 show the structure in an embodiment of the present invention. The embodiment is provided for illustrative purposes only and not intended to be restrictive of the scope of patent protection sought by the applicant.

Figure 1:
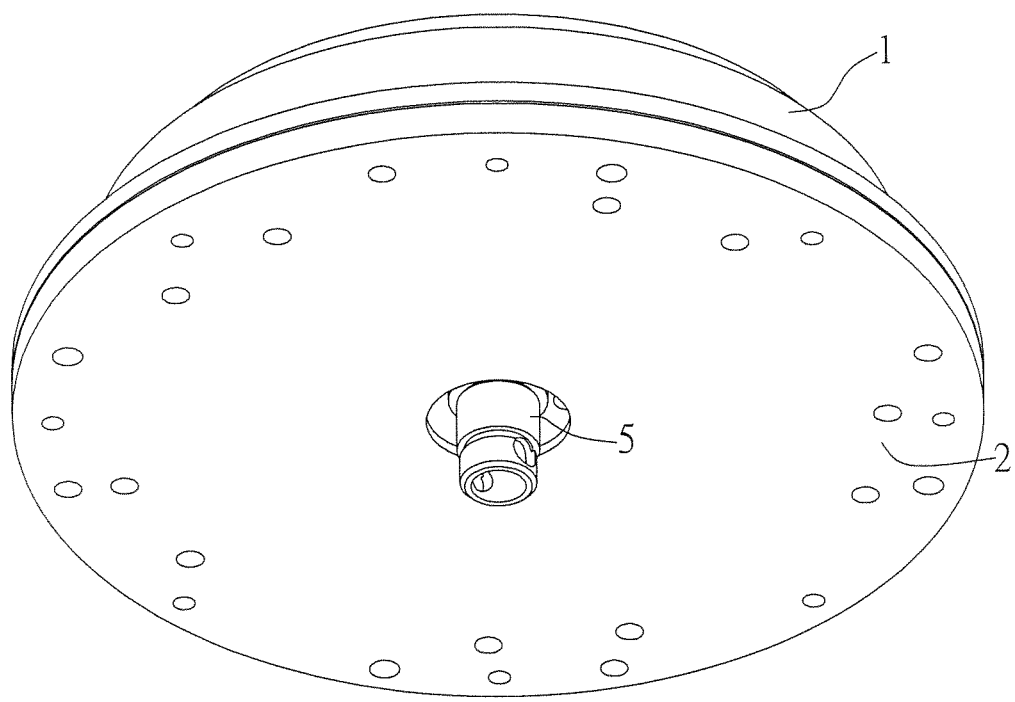
FIG. 1 is an assembled perspective view of the present invention.
Figure 2:
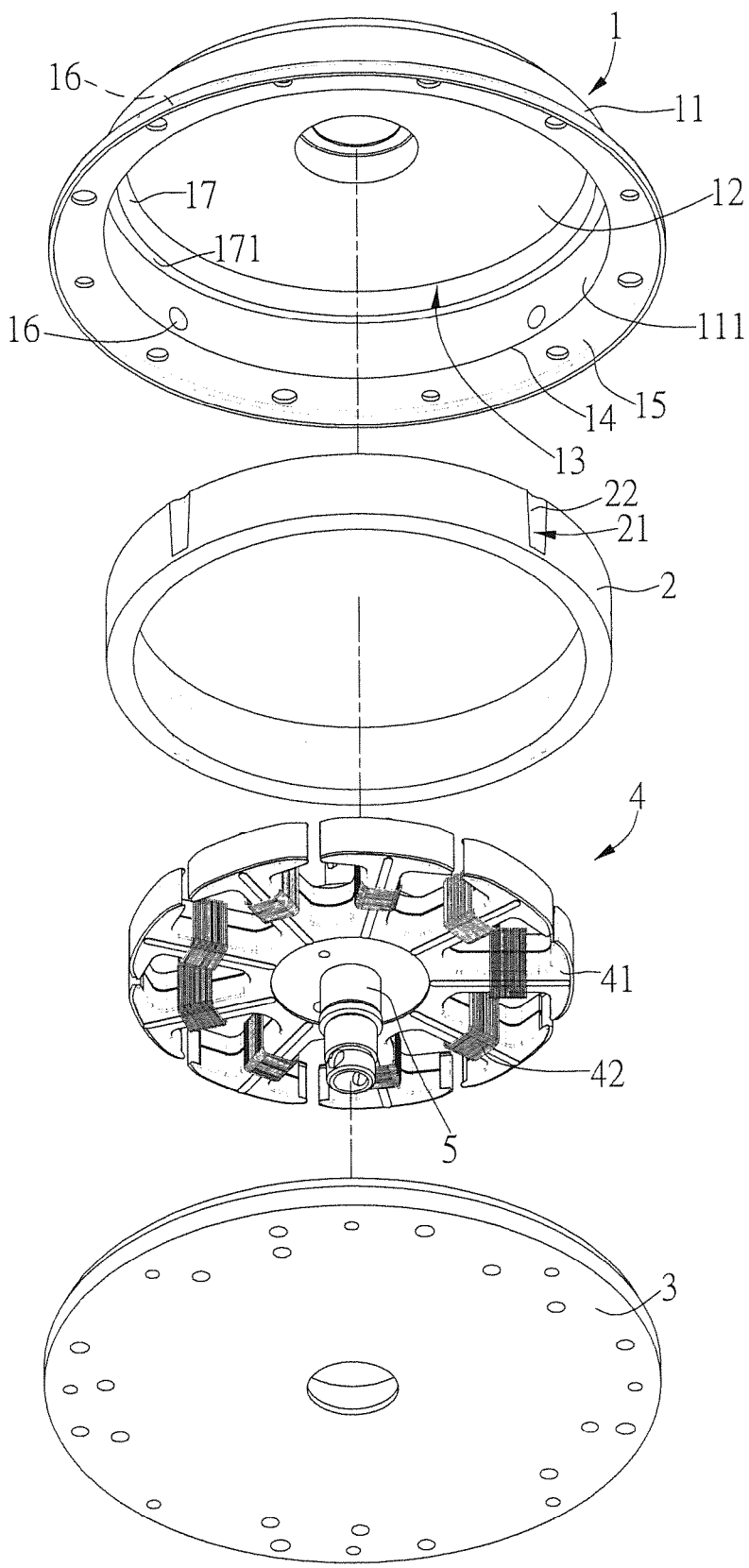
FIG. 2 is an exploded perspective view of the present invention.

In this embodiment, referring to FIG. 1 and FIG. 2, a ceiling fan motor structure includes a housing 1, a magnetic ring 2, and a cover 3.

Figure 3:
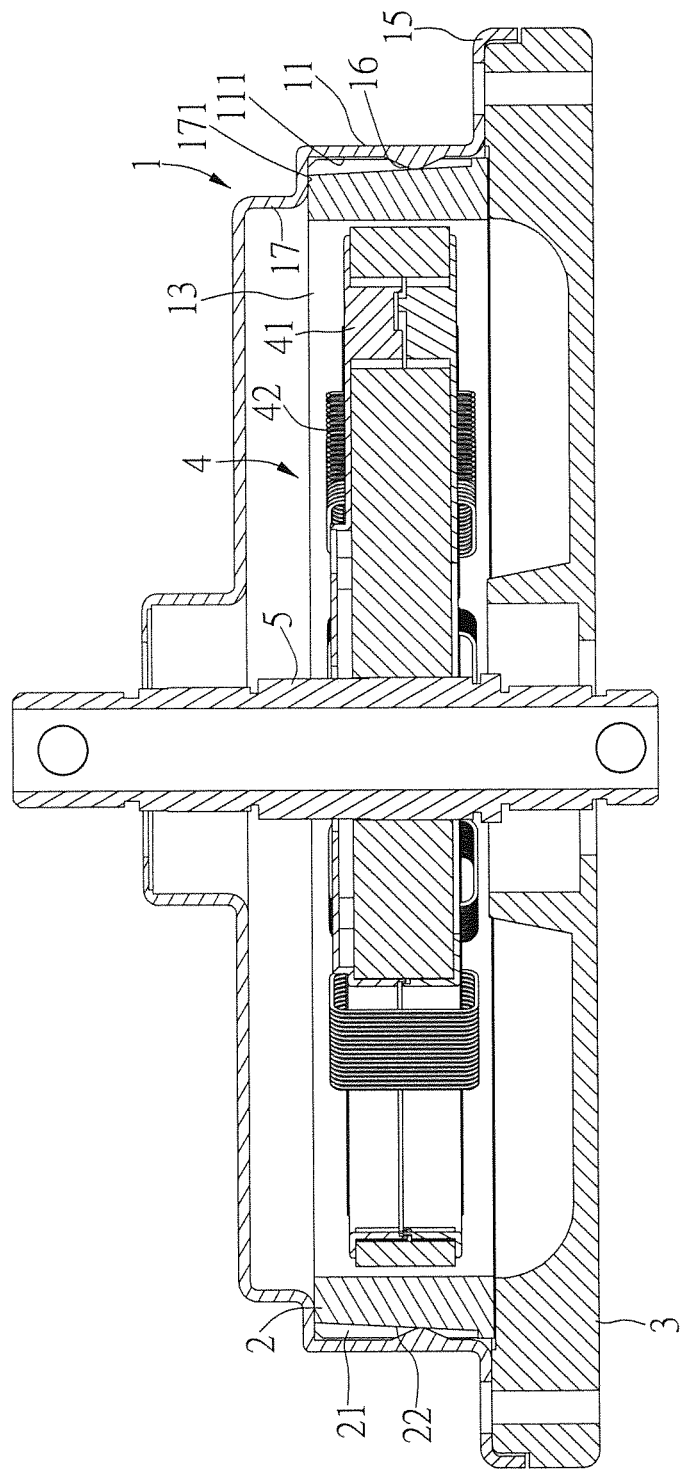
FIG. 3 is a sectional view of the present invention.

As shown in FIG. 2 and FIG. 3, the housing 1 has an annular wall 11 and a shielding plate 12. The annular wall 11 together with the shielding plate 12, which is provided on one side of the annular wall 11, defines a receiving room 13.

The opposite side of the annular wall 11 is open and forms an opening 14. The housing 1 has an annular edge 15 around the opening 14. The annular edge 15 is an outward extension of the housing 1 from the periphery of the opening 14. In addition, the annular wall 11 has a plurality of projections 16 projecting from the inner wall surface 111 of the receiving room 13. The projections 16 are integrally formed with the annular wall 11 by stamping the annular wall 11.

As shown in FIG. 2 and FIG. 3, the outer periphery of the magnetic ring 2 has a plurality of recesses 21. The recesses 21 correspond in position to the projections 16 of the housing 1 respectively. The magnetic ring 2 is placed into the receiving room 13 of the housing 1 with the recesses 21 aligned respectively with the projections 16, allowing each projection 16 to be placed into a corresponding one of the recesses 21, with a view to preventing relative rotation between the magnetic ring 2 and the housing 1. In this embodiment, the housing 1 forms a step 17 inside the annular wall 11. The step 17 surrounds the periphery of the shielding plate 12 and has a step surface 171 facing the opening 14. When placed in the receiving room 13, the magnetic ring 2 is pressed against the step surface 171.

As shown in FIG. 2 and FIG. 3, each recess 21 in this embodiment extends radially inward from the outer periphery of the magnetic ring 2. Moreover, the radial depth of each recess 21 increases in a direction toward the shielding plate 12 and decreases in a direction away from the shielding plate 12; consequently, the bottom 22 of each recess 21 is inclined. When the magnetic ring 2 is placed in the receiving room 13 of the housing 1, the tip of each projection 16 is pressed against the bottom 22 of the corresponding recess 21 to secure the projection in place. Besides, each recess 21 extending radially inward from the outer periphery of the magnetic ring 2 is open at the end facing the shielding plate 12 and closed at the end facing away from the shielding plate 12. This means that each projection 16 can be placed into the corresponding recess 21 of the magnetic ring 2 only through the open end of the recess.

As shown in FIG. 1 to FIG. 3, the cover 3 closes the opening 14 and is fixedly connected to the housing 1. In this embodiment, the cover 3 is plate-shaped and has a width matching the annular edge 15 of the housing 1. The cover 3 is connected to the annular edge 15 and thereby closes the opening 14, and the receiving room 13 is closed once the opening 14 is closed by the cover 3. Also provided in the receiving room 13 is an excitation coil 4 which is part of the motor structure and which includes a coil former 41 and conductive wires 42 wound around the coil former 41. In addition, a rotating shaft 5 extends through the housing 1, the coil former 41, and the cover 3 to serve as the rotating shaft of the blades (not shown) of a ceiling fan.

Figure 4:
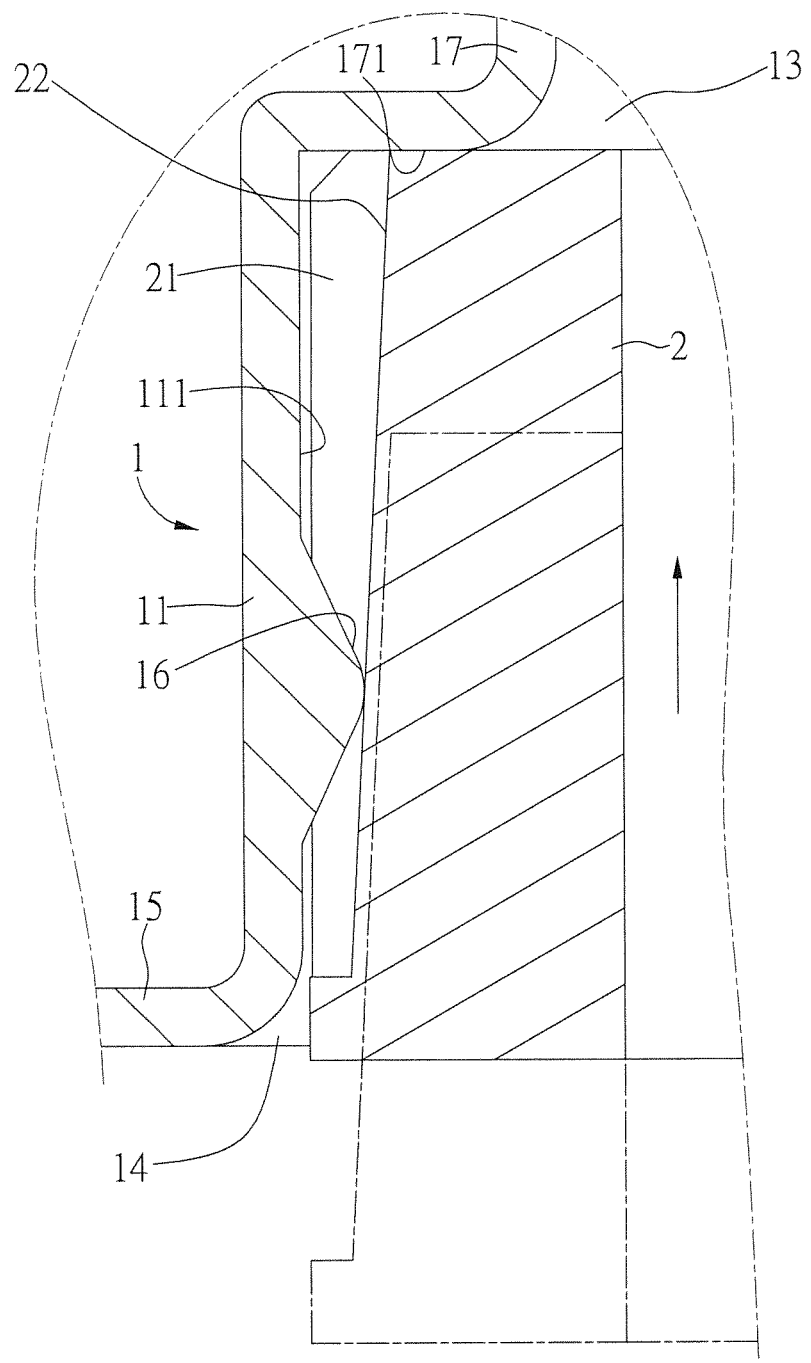
FIG. 4 is a schematic partial sectional view in which the magnetic ring of the present invention is placed in the receiving room of the housing, with the tip of each projection pressed against the bottom of the corresponding recess.
Figure 5:
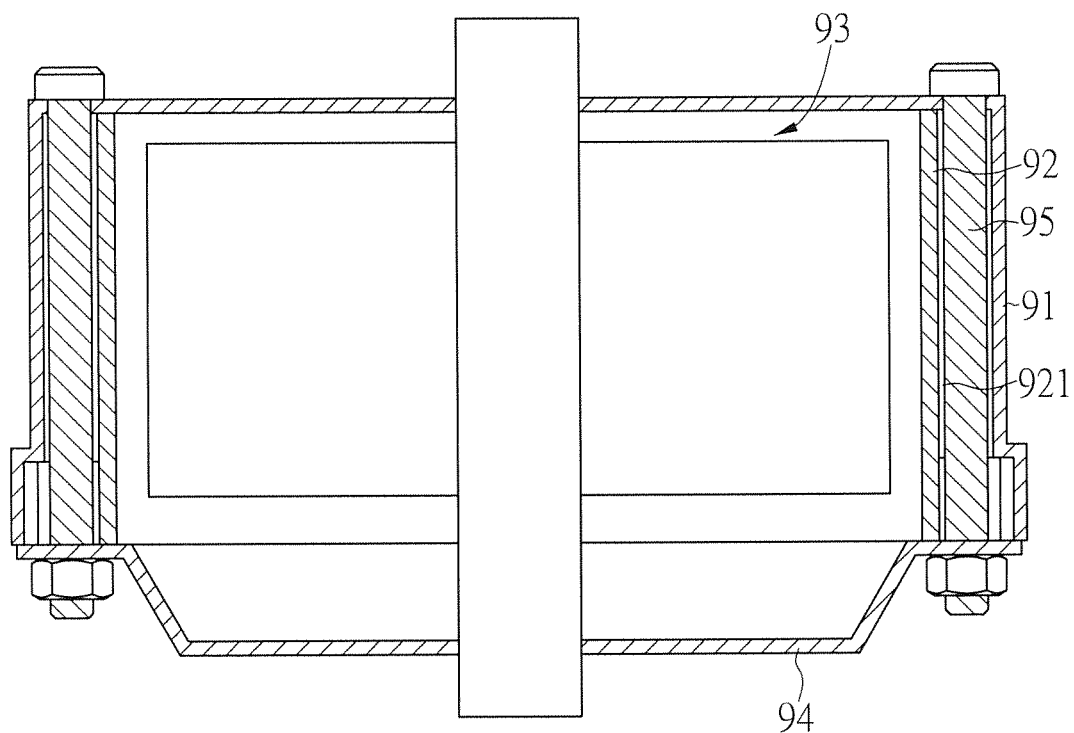
FIG. 5 is a schematic side sectional view of a conventional ceiling fan motor structure.
Figure 6:
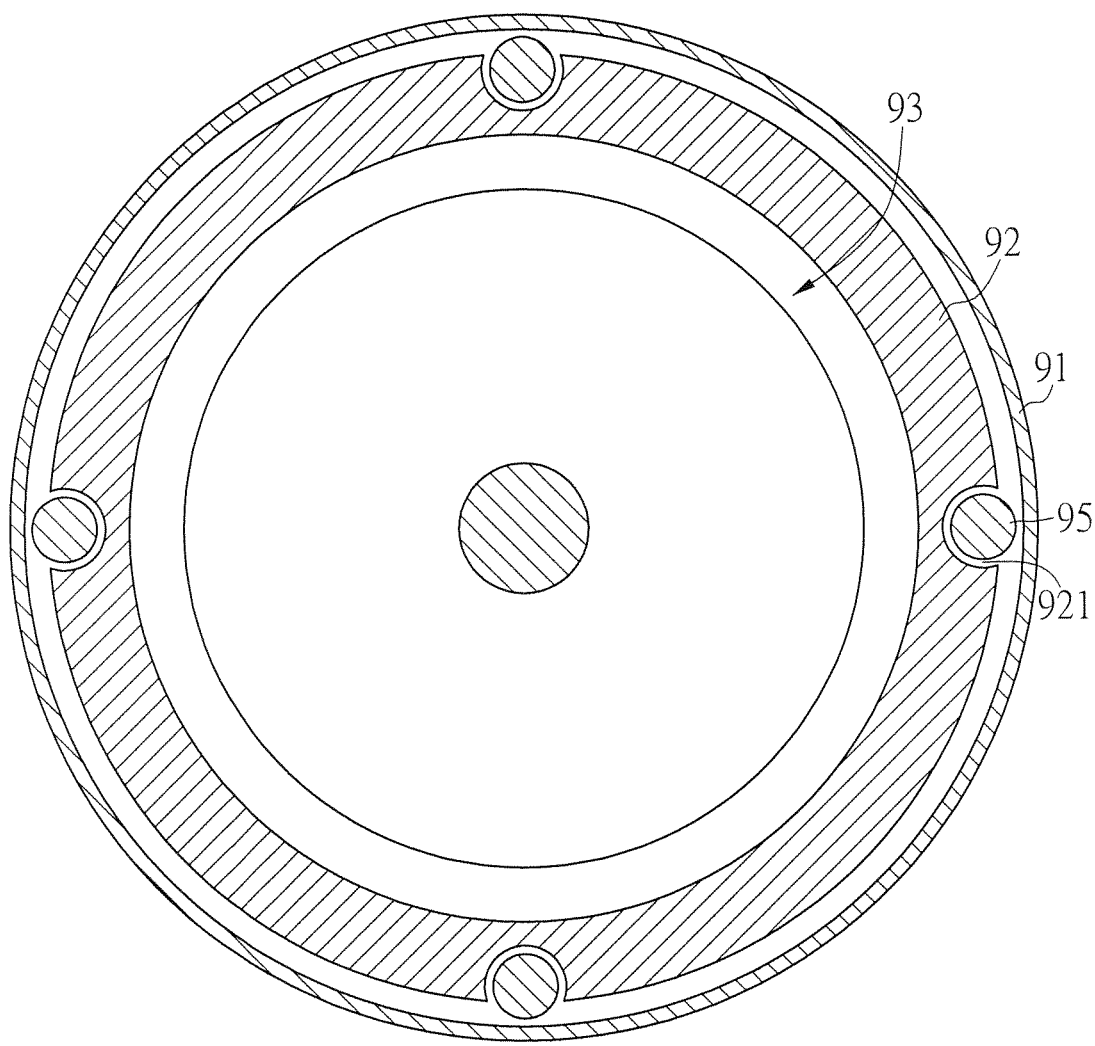
FIG. 6 is a schematic top sectional view of the conventional ceiling fan motor structure in FIG. 5.

To assemble the ceiling fan motor structure in this embodiment, the magnetic ring 2 is mounted into the receiving room 13 of the housing 1 by, as mentioned above, aligning the recesses 21 of the magnetic ring 2 with the projections 16 respectively and then, as shown in FIG. 4, putting the magnetic ring 2 into the receiving room 13 of the housing 1 until the magnetic ring 2 is pressed against the step surface 171. In consequence, each projection 16 is in the corresponding recess 21 and fixed in place now that the tip of each projection 16 is pressed against the bottom 22 of the corresponding recess 21. Also, the magnetic ring 2 and the housing 1 are kept from rotating relative to each other. After that, the excitation coil 4 and the rotating shaft 5 are mounted into the receiving room 13 to conclude the assembly of the ceiling fan motor structure.

According to the foregoing, the present invention is advantageous in that:

1. During assembly of the ceiling fan motor structure, the assembler only has to align the recesses 21 of the magnetic ring 2 with the projections 16 of the housing 1 respectively (which projections 16 are in the receiving room 13), and the magnetic ring 2 can be easily mounted into the receiving room 13 of the housing 1. In contrast to the conventional ceiling fan motor structure described above, which requires the shafts 95 to be inserted through the grooves 921 respectively, the present invention simplifies the assembly process and advantageously features convenience and efficiency of assembly.

2. As each recess 21 of the magnetic ring 2 is open at one end (i.e., the end facing the shielding plate 12) and closed at the opposite end (i.e., the end facing away from the shielding plate 12), the projections 16 can enter only the open ends of the recesses 21 of the magnetic ring 2 respectively. This foolproof design allows the magnetic ring 2 to be rapidly mounted into the receiving room 13. Furthermore, without the recesses 21 penetrating the magnetic ring 2, the magnetic ring 2 has higher structural strength in areas around the recesses 21 than its prior art counterparts and is therefore less likely to break in areas around the recesses 21.

What is claimed is:

1. A ceiling fan motor structure, comprising:
a housing having an annular wall and a shielding plate on one side of the annular wall, the annular wall and the shielding plate jointly defining a receiving room, the annular wall having an open opposite side forming an opening, the housing having an annular edge extending around, and outward from a periphery of, the opening, the annular wall further having a plurality of projections projecting from an inner wall surface of the receiving room;
a magnetic ring having an outer periphery pro vided with a plurality of recesses corresponding respectively to the projections, the magnetic ring being placed in the receiving room of the housing in a way in which the recesses are respectively aligned with the projections and in which each said projection is placed in a corresponding one of the recesses to prevent relative rotation between the magnetic ring and the housing; and
a cover closing the opening and fixedly connected to the housing.

2. The ceiling fan motor structure of claim 1, wherein each said recess extends radially inward from the outer periphery of the magnetic ring to a depth increasing in a direction toward the shielding plate and decreasing in a direction away from the shielding plate such that an inclined bottom is formed, and when the magnetic ring is placed in the receiving room of the housing, each said projection has a tip pressed against the inclined bottom of the corresponding one of the recesses and is thus fixed in position.

3. The ceiling fan motor structure of claim 1, wherein each said recess extends radially inward from the outer periphery of the magnetic ring and has an open end facing the shielding plate and a closed end facing away from the shielding plate such that each said projection is allowed to enter only the open end of the corresponding one of the recesses of the magnetic ring.

4. The ceiling fan motor structure of claim 1, wherein the housing forms a step inside the annular wall, the step surrounds a periphery of the shielding plate and has a step surface facing the opening, and the magnetic ring is pressed against the step surface when placed in the receiving room.

5. The ceiling fan motor structure of claim 1, wherein the cover is plate-shaped, has a width matching the annular edge of the housing, and is connected to the annular edge to close the opening.

6. The ceiling fan motor structure of claim 1, wherein the recesses are integrally formed with the annular wall by stamping the annular wall.

\* \* \* \* \*